US010753514B2

(12) United States Patent
Tran et al.

(10) Patent No.: US 10,753,514 B2
(45) Date of Patent: Aug. 25, 2020

(54) INTERLOCKING PIPE SUPPORT (71) Applicant: PACCAR Inc, Bellevue, WA (US)

(72) Inventors: Richard Tran, Bothell, WA (US);
Spencer Larsen, Bellevue, WA (US);
Adrian Murias, Mercer Island, WA (US)

(73) Assignee: PACCAR Inc, Bellevue, WA (US)

( * ) Notice: Subject to any disclaimer, the term of this patent is extended or adjusted under 35 U.S.C. 154(b) by 9 days.

(21) Appl. No.: 15/628,423

(22) Filed: Jun. 20, 2017

(65) Prior Publication Data

US 2018/0363805 A1  Dec. 20, 2018

(51) Int. Cl.
*F16L 3/12* (2006.01)
*F16L 3/04* (2006.01)
*F16L 3/14* (2006.01)
*F16L 3/10* (2006.01)
*F16L 3/123* (2006.01)

(52) U.S. Cl.
CPC ............... *F16L 3/1211* (2013.01); *F16L 3/04* (2013.01); *F16L 3/1008* (2013.01); *F16L 3/1083* (2013.01); *F16L 3/1207* (2013.01); *F16L 3/14* (2013.01); *F16L 3/1226* (2013.01); *F16L 3/1233* (2013.01)

(58) Field of Classification Search
CPC ....... F16L 3/105; F16L 3/1075; F16L 3/1083; F16L 3/1033; F16L 3/1207; F16L 3/1211; F16L 3/04; F16L 3/14; F16L 3/1008
See application file for complete search history.

(56) References Cited

U.S. PATENT DOCUMENTS

| 806,192 | A | * | 12/1905 | Russell | F16L 3/14 248/59 |
| 3,301,514 | A | * | 1/1967 | Masao | F16L 3/1083 248/73 |
| 4,557,447 | A | * | 12/1985 | Combe | F16L 3/127 248/62 |
| 6,460,813 | B1 | * | 10/2002 | Gretz | F16L 3/1025 248/62 |
| 2005/0188509 | A1 | * | 9/2005 | Sharkey | F16L 3/1025 24/20 R |
| 2006/0035507 | A1 | | 2/2006 | Miles et al. | |

(Continued)

FOREIGN PATENT DOCUMENTS

DE  2341814 A * 3/1974
DE  9211062 U1 * 10/1992  ............ F16L 3/1008

(Continued)

OTHER PUBLICATIONS

"Pipe Clamps—Stainless Steel," Anzor, Brisbane, Australia, <http://www.anzor.com.au/stainless-steel-tube-pipe-fittings/pipe-clamps-nb-pipe-plaint/product> [retrieved Jun. 14, 2017], pp. 1-3.

(Continued)

*Primary Examiner* — Eret C McNichols
(74) *Attorney, Agent, or Firm* — Seed IP Law Group LLP (57) ABSTRACT

An interlocking pipe support includes a first interlocking bracket configured to interlock with a second interlocking bracket, wherein the first and second interlocking brackets are moveable between a first interlocking position in which they are configured to partially surround an exterior of a pipe, and a second interlocking position in which they impose a clamping load on the exterior of the pipe.

17 Claims, 6 Drawing Sheets

(56) References Cited

U.S. PATENT DOCUMENTS

| | | | |
|---|---|---|---|
| 2006/0213039 A1* | 9/2006 | Sampson | F16L 3/1025 |
| | | | 24/530 |
| 2010/0219301 A1* | 9/2010 | Sampson | F16L 3/1083 |
| | | | 248/74.1 |
| 2010/0281658 A1* | 11/2010 | Nguyen | F16L 3/1025 |
| | | | 24/457 |
| 2013/0117971 A1 | 5/2013 | Sampson | |
| 2016/0131281 A1* | 5/2016 | Juzak | F16B 35/06 |
| | | | 248/74.3 |
| 2017/0030487 A1* | 2/2017 | Sampson | F16L 3/1083 |

FOREIGN PATENT DOCUMENTS

| | | | | |
|---|---|---|---|---|
| DE | 29704780 U1 | * | 7/1998 | ............ F16L 3/1008 |
| DE | 29812939 U1 | * | 11/1999 | ............ F16L 3/1008 |
| DE | 102005037200 A1 | * | 2/2007 | ............ F16L 3/1008 |
| DE | 102010053357 A1 | * | 2/2012 | ............ F16L 3/1008 |
| EP | 1176349 A2 | * | 1/2002 | ............ F16L 3/1008 |
| GB | 462718 A | * | 3/1937 | ............ F16L 3/1008 |
| KR | 2017121969 A | * | 11/2017 | |
| KR | 2018053050 A | * | 5/2018 | |
| WO | WO-8901106 A1 | * | 2/1989 | ............ F16L 3/1008 |

OTHER PUBLICATIONS

International Search Report dated Oct. 25, 2018, issued in corresponding International Application No. PCT/US2018/032689, filed May 15, 2018, 6 pages.

* cited by examiner

INTERLOCKING PIPE SUPPORT

BACKGROUND

Pipe support assemblies are used to support a pipe extending between an inlet and an outlet. Prior art assemblies may include a pipe fitting having a circular opening for receiving the pipe, and a mechanism for securing the fitting to a structure. Other assemblies may include a pipe clamping structure that partially surrounds the pipe through biasing means, or opposing pieces secured together through fasteners or otherwise. Wire type stainless steel clamps, similar to a zip tie, may also be used.

The above-described assemblies are complicated in structure and operation, and/or they do not lock onto the pipe to secure the pipe in its position relative to the assembly. Accordingly, an improved pipe support assembly is desired.

SUMMARY

An interlocking pipe support includes a first interlocking bracket configured to interlock with a second interlocking bracket, wherein the first and second interlocking brackets are moveable between a first interlocking position in which they are configured to partially surround an exterior of a pipe, and a second interlocking position in which they impose a clamping load on the exterior of the pipe.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

FIGS. 1-6 depict an interlocking pipe support 20 formed in accordance with an exemplary embodiment of the present disclosure. The interlocking pipe support 20 includes first and second substantially identical interlocking brackets 30 and 34 that are configured to interlock and clamp onto a pipe or other structure for securing the pipe to another structure. In the exemplary environmental view of FIG. 1, the interlocking pipe support 20 is shown in use with a water pipe assembly of an internal combustion engine for a heavy duty vehicle. In particular, the interlocking pipe support 20 is shown clamping onto and securing a portion of a water pipe P to a bracket assembly B. However, it should be appreciated that the interlocking pipe support 20 may instead be used with any suitable pipe, tube, or similar structure. For instance, the interlocking pipe support 20 may instead be used to secure an exhaust pipe to a vehicle. In that regard, the term "pipe" should be understood to include any suitable hollow structure, such as a tube, conduit, channel, duct, line, etc., used to convey water, gas, oil, or other substances, or other structure, such as a frame member, requiring support and attachment to another structure member. Accordingly, the descriptions and illustrations provided herein should not be seen as limiting.

Referring to FIGS. 2-6, the first interlocking bracket 30 will now be described in detail. As noted above, the first and second interlocking brackets 30 and 34 are substantially identical. Therefore, the second interlocking bracket 34 will not be described in detail. In that regard, substantially identical features of the first and second interlocking brackets 30 and 34 are labeled with the same reference numerals for ease of description.

Figure 1:
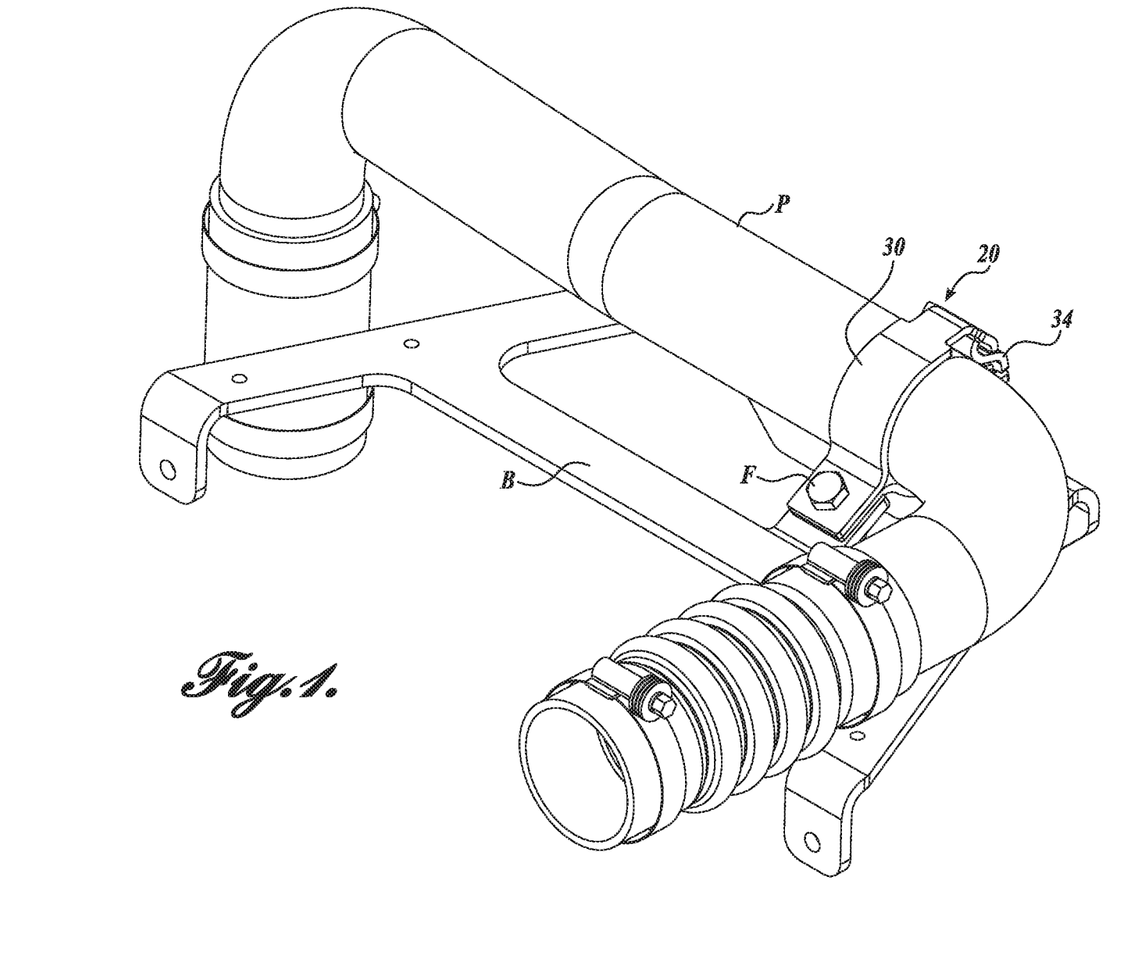
FIG. 1 is an environmental view of an interlocking pipe support formed in accordance with an exemplary embodiment of the present disclosure, wherein the interlocking pipe support includes first and second substantially identical interlocking brackets.
Figure 2:
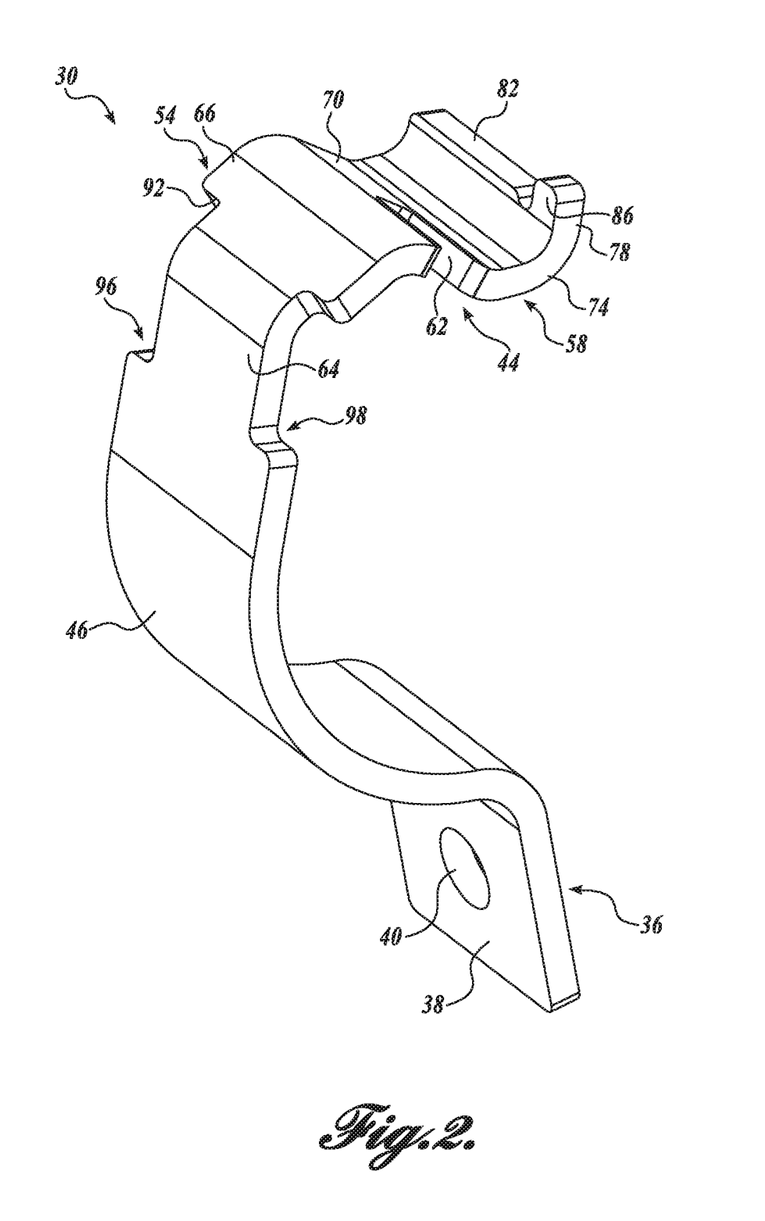
FIG. 2 is an isometric view of the first interlocking bracket of the interlocking pipe support shown in FIG. 1.

The first interlocking bracket 30 is generally defined by an elongated body 36 that originates from a piece of flat strip metal or another suitable material that is bent, formed, shaped and/or cut into the desired configuration. The original piece of flat strip metal has a predetermined thickness, length, and width (resulting in an axial length of the elongated body 36 when formed) for the intended application. In the depicted exemplary embodiment, the elongated body 36 is generally C-shaped in cross-section to define a mounting foot 38 at a first end, an interlocking/clamping portion 44 at a second opposite end, and a pipe-surrounding portion 46 extending between the mounting foot 38 and the interlocking/clamping portion 44. More specifically, the pipe surrounding portion 46 generally conforms to the shape of the pipe P or other structure to which the first and second interlocking brackets 30 and 34 will be mounted. In that regard, the pipe surrounding portion 46 may instead be any other suitable shape and size for the intended application.

Figure 4:
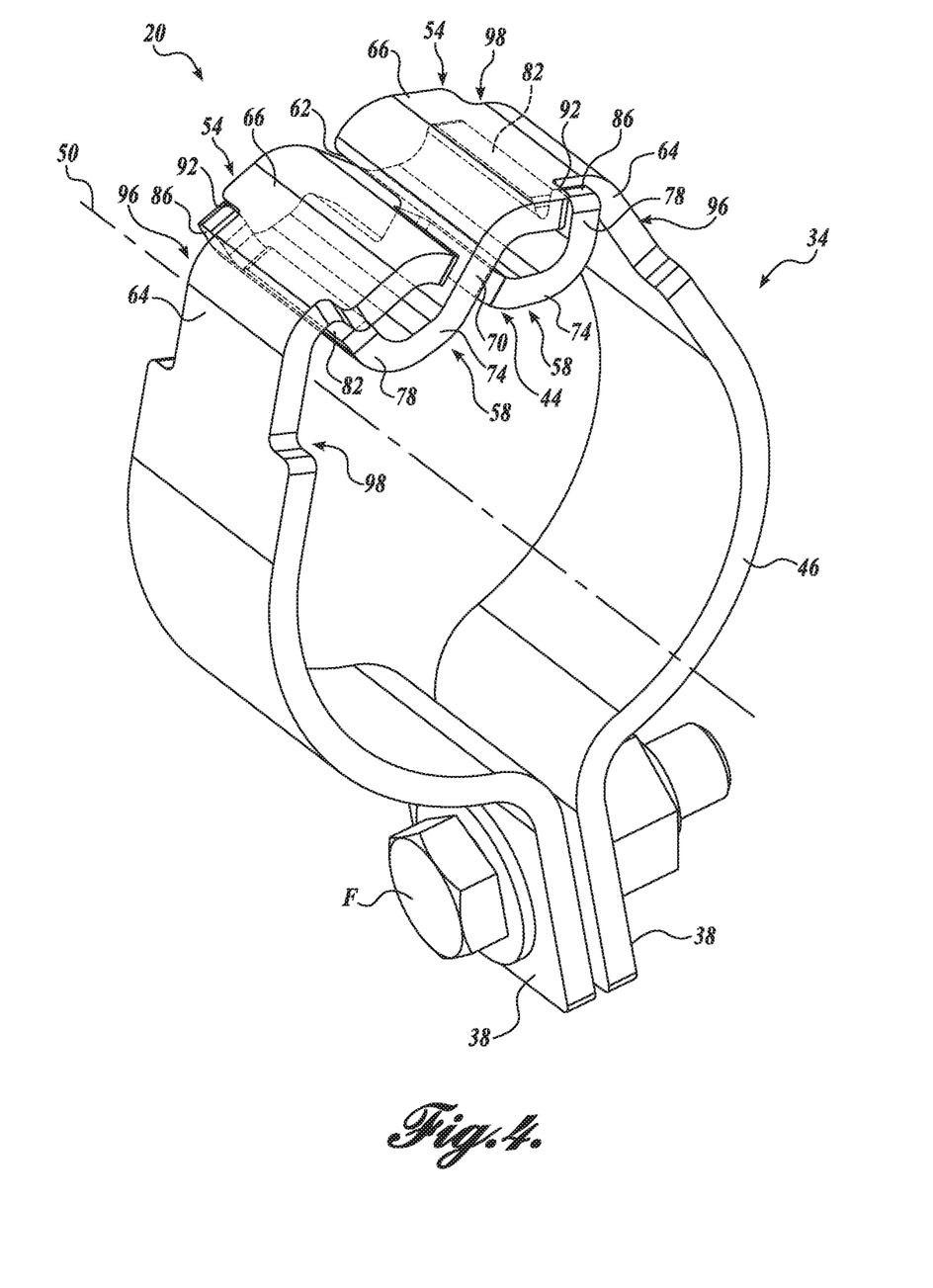
FIG. 4 is an isometric view of the interlocking pipe support shown in FIG. 1, wherein the interlocking pipe support is shown in a second interlocking position.
Figure 6:
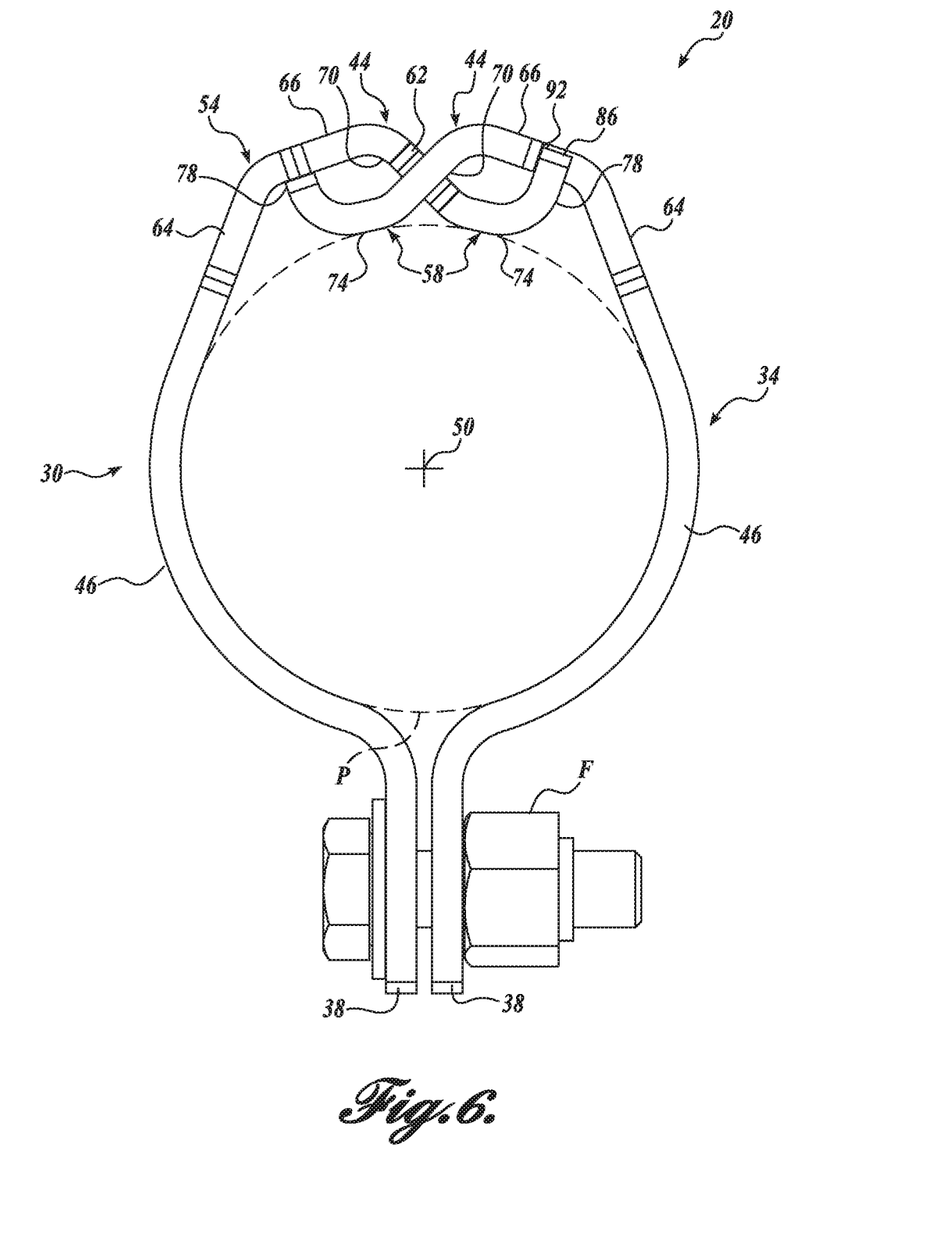
FIG. 6 is a side view of the interlocking pipe support shown in FIG. 4, wherein an exemplary outline of a pipe is shown in dashed lines.

The mounting foot 38 extends substantially radially from the pipe surrounding portion 46 (and the pipe P), such that it may be mounted to the correspondingly shaped mounting foot 38 of the second interlocking bracket 34 when the first and second interlocking bracket 30 and 34 are in a second interlocking position (see FIGS. 4 and 6). More specifically, the mounting foot 38 extends radially outwardly from a center axis 50 defined by the first and second interlocking brackets 30 and 34 when in the second interlocking position. The mounting foot 38 may include an opening 40 for receiving a fastener or the like for securing the mounting foot 38 of the first interlocking bracket 30 to the mounting foot 38 of the second interlocking bracket 34.

It should be appreciated that the first and second interlocking brackets 30 and 34 may instead be secured together at their first ends in any other suitable manner. Moreover, the mounting foot 38 may additionally be configured for securing the interlocking pipe support 20 to another structure, such as the bracket B shown in FIG. 1. In that regard, the mounting foot 38 extends a sufficient radial distance from the pipe P when the first and second interlocking brackets 30 and 34 are in the second interlocking position such that the mounting foot 38 may be easily attached to another structure.

The interlocking/clamping portions 44 of the first and second interlocking brackets 30 and 24 are configured to interlock and clamp down onto a pipe P when the first and second interlocking brackets 30 and 34 are moved into the second interlocking position, as shown in FIGS. 4 and 6. In that regard, aspects of the interlocking/clamping portion 44 will be described with reference to a pipe P when secured between the first and second interlocking brackets 30 and 34 in the second interlocking position. However, such description should not be seen as limiting.

Figure 5:
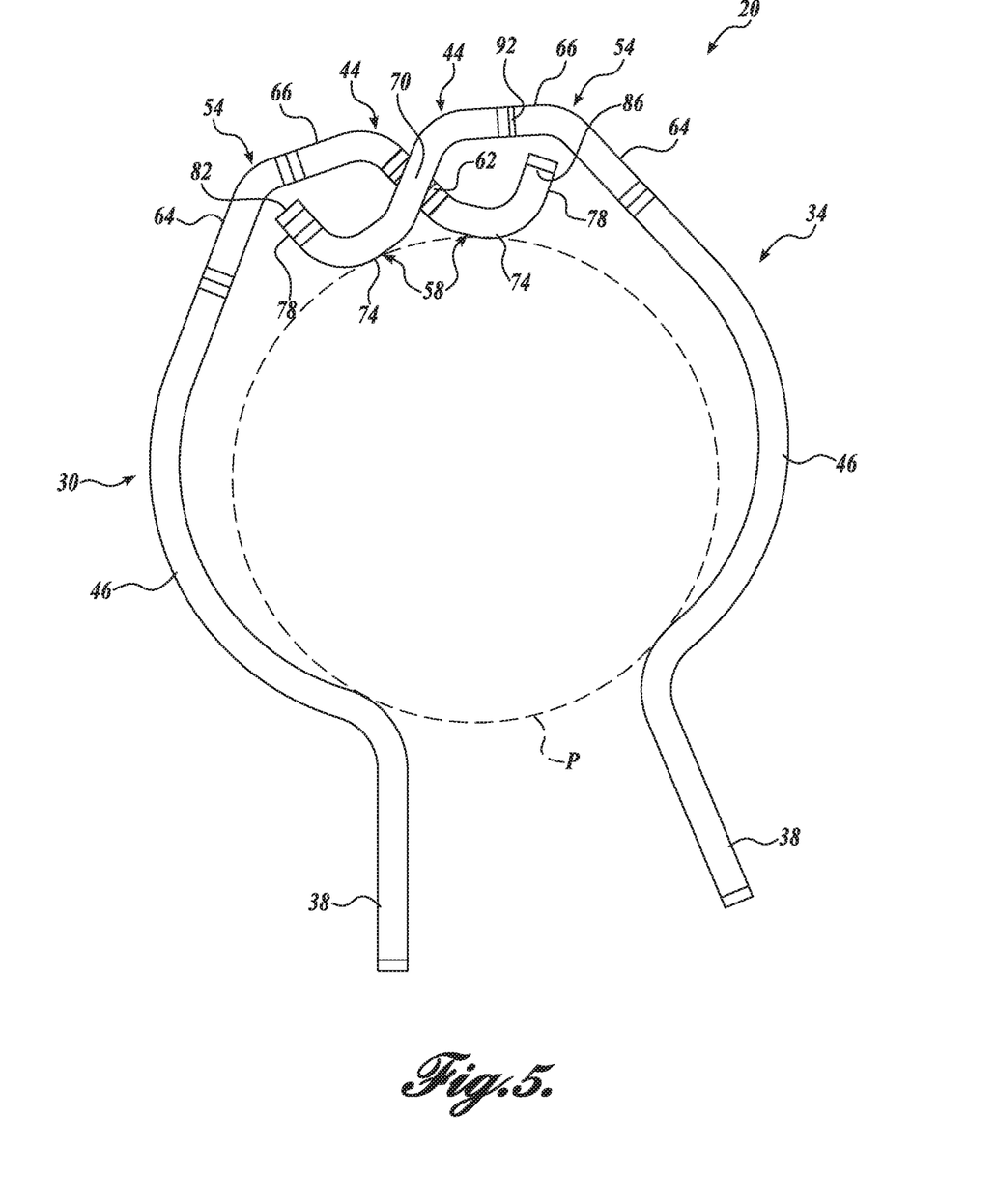
FIG. 5 is a side view of the interlocking pipe support shown in FIG. 3, wherein an exemplary outline of a pipe is shown in dashed lines.

As can best be seen by referring to FIGS. 5 and 6, the interlocking/clamping portion 44 is generally S-shaped in cross-section, having a clamp-opposing portion 54 spaced from the exterior of the pipe P, a clamping portion 58 engaging the exterior of the pipe P, and an interlocking slot portion 70 extending between the clamping portion 58 and the clamp-opposing portion 54.

The clamp-opposing portion 54 is defined in part by a tangential portion 64 extending tangentially from the pipe-surrounding portion 46, and in part by a substantially straight or flat circumferentially-extending portion 66 extending from the tangential portion 64 in a spaced substantially parallel relationship from the circumference of the pipe P. The interior surface of the circumferentially-extending portion 66 opposes an interlocking force of the clamping portion 58 when the first and second interlocking brackets 30 and 34 are moved into the second interlocking position.

In that regard, the clamping portion 58 is generally defined by a pipe engaging portion 74 that extends along the exterior of the pipe P in the second interlocking position, and an upwardly turned edge 78 extending from the pipe engaging portion 74 that terminates in an axial end engagement surface 82. The upwardly turned edge 78 extends outwardly from the pipe P such that the axial end engagement surface 82 engages the interior surface of the circumferentially-extending portion 66 in the second interlocking position.

Figure 3:
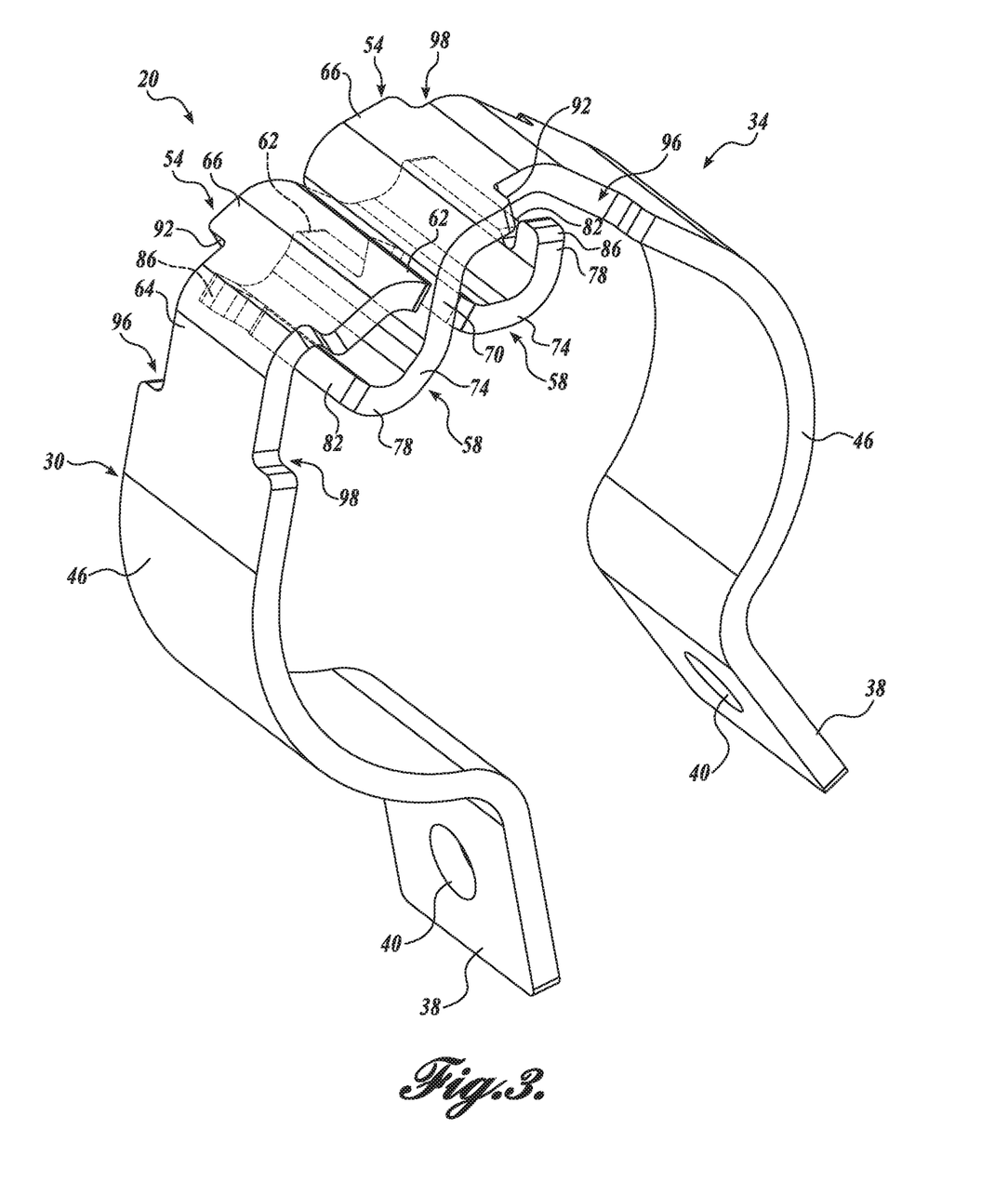
FIG. 3 is an isometric view of the interlocking pipe support shown in FIG. 1, wherein the interlocking pipe support is shown in a first interlocking position.

The interlocking slot portion 70 extends diagonally from the circumferentially-extending portion 66 of the clamp-opposing portion 54 to the pipe engaging portion 74 of the clamping portion 58. The interlocking slot portion 70 includes an axial slot 62 extending from an edge along a portion of its axial length. As shown in FIGS. 3 and 4, the axial slot 62 of the first interlocking bracket 30 interfaces the axial slot 62 of the second interlocking bracket 34 to position the clamping portion 58 of each of the first and second interlocking brackets 30 and 34 beneath the clamp-opposing portion 54 of the other of the first and second interlocking brackets 30 and 34.

A locking tab 86 extends from a corner of the upwardly turned edge 78 of the first interlocking bracket 30 on the same side or edge from which the axial slot 62 extends. The locking tab 86 is receivable within a locking tab recess, or first cutout 96 of the second interlocking bracket 34 to help secure the first and second interlocking brackets 30 and 34 in the second interlocking position. With reference to the first interlocking bracket 30 depicted in FIG. 2, the first cutout 96 extends along a length of the tangential portion 64 and the circumferentially-extending portion of the clamp-opposing portion 54 and extends axially inwardly from the edge opposite the locking tab 86 a predetermined distance suitable for receiving the locking tab 86 of the second interlocking bracket 34. In that regard, the first cutout 96 defines a locking tab shoulder 92 at its upper end against which the locking tab 86 may abut. The locking tabs 86 and the axial slots 62 work in opposition to secure the first interlocking bracket 30 in its axial position relative to the second interlocking bracket 34 while maintaining a clamping force on the pipe P.

It should be appreciated that the first cutout 96 and/or locking tab 86 may be any suitable shape and size for creating an axial force opposite to the interface of the axial slot 62. Moreover, the first cutout 96 may also be configured to be used in conjunction with a second opposite cutout 98 that may be substantially identical in size, shape and location along the opposite edge. With the first and second cutouts 96 and 98 defined along the clamp-opposing portion 54 and therefore spaced from the pipe P, zip-ties or the like may be passed around the bracket and secured within the recesses defined by the first and second cutouts 96 and 98.

The operation of the pipe support assembly 20 will now be described. Referring to FIGS. 3 and 5, the first and second interlocking brackets 30 and 34 are first moved into a first interlocking position where the brackets are configured for being secured onto the pipe P. More specifically, the axial slot 62 of the first interlocking bracket 30 axially receives the interlocking slot portion 70 of the second interlocking bracket 34, and the axial slot 62 of the second interlocking bracket 34 axially receives the interlocking slot portion 70 of the first interlocking bracket 30. The first and second interlocking brackets 30 and 34 may be moved axially toward each other until the interlocking slot portion 70 is fully received within the axial slot 62 of the other bracket.

The first and second interlocking brackets 30 and 34 may be moved into the first interlocking position while substantially surrounding the pipe P, or the first and second interlocking brackets 30 and 34 may be first interlocked by way of the axial slots 62 and then moved into position around the pipe P. Regardless, with the first and second interlocking brackets 30 and 34 surrounding the pipe P, as shown in FIG. 5, the first and second interlocking brackets 30 and 34 may then be moved into the second interlocking position shown in FIGS. 4 and 6.

To move the first and second interlocking brackets 30 and 34 into the second interlocking position, the first and/or second interlocking bracket 30 and/or 34 is pivoted toward the other bracket about the axial pivot axis defined by the interface of the axial slots 62 and the interlocking slot portions 70. For instance, as shown in FIGS. 3-6, the first and second interlocking brackets 30 and 34 may be positioned around the pipe P, with a bottom portion of the pipe-surrounding portions 46 engaging a bottom portion of the pipe P. In this position, the second interlocking bracket 34 may be pivoted toward the first interlocking bracket 30 until the mounting foot 38 of the second interlocking bracket 34 engages or is positioned adjacent to the mounting foot 38 of the first interlocking bracket 30 such that a fastener F may be passed therethrough.

As the second interlocking bracket 34 pivots about the axis defined by the interface of the axial slots 62 and the interlocking slot portions 70, the pipe-surrounding portions 46 of the first and second interlocking brackets 30 and 34 engage and push upwardly on the bottom of the pipe P. At the same time, the pipe engaging portion 74 of the second interlocking bracket 34 pivots upwardly toward the circumferentially-extending portion 66 of the first interlocking bracket 30 until the axial end engagement surface 82 engages the interior surface of the circumferentially-extending portion 66.

When the first and second interlocking brackets 30 and 34 reach the second interlocking position, the upwardly pushed pipe P imposes a normal force on the pipe engaging portions 74, and the circumferentially-extending portions 66 oppose the normal force imposed on the pipe engaging portions 74. An interference fit is therefore defined between the pipe P and the interior surfaces of the interlocked first and second interlocking brackets 30 and 34; i.e., between the pipe P and the interior surfaces of the pipe engaging portions 74 and the pipe-surrounding portions 46. The interference fit essentially allows the interlocking pipe support 20 to clamp down onto the pipe P, substantially preventing any axial movement of the pipe P relative to the interlocking pipe support 20.

Moreover, as noted above, the locking tab 86 of each interlocking bracket is receivable within the first cutout 96 of the other interlocking bracket for helping to secure the first and second interlocking brackets 30 and 34 in the second interlocking position. In particular, the interface of the locking tab 86 of the first interlocking bracket 30 and the first cutout 96 of the second interlocking bracket 34 substantially prevents the first interlocking bracket 30 from moving in a first axial direction. At the same time, the interface of the interlocking slot portion 70 of the second interlocking bracket 34 and the axial slot 62 of the first interlocking bracket 30 substantially prevents the first interlocking bracket 30 from moving in an opposite second axial direction.

Likewise, the interface of the locking tab 86 of the second interlocking bracket 34 and the first cutout 96 of the first interlocking bracket 30 substantially prevents the second interlocking bracket 34 from moving in the second axial direction, and the interface of the interlocking slot portion 70 of the first interlocking bracket 30 and the axial slot 62 of the second interlocking bracket 34 substantially prevents the second interlocking bracket 34 from moving in the first axial direction.

Accordingly, the first and second interlocking brackets are substantially locked in their axial positions at their upper ends. With the mounting feet 38 secured together with a fastener or the like, the first and second interlocking brackets are also substantially locked in their axial positions at their lower ends. As can be appreciated, the interference fit combined with the locked axial position of the interlocking brackets 30 and 34 defines a simple pipe support assembly that may be securely attached to a pipe P.

The detailed description set forth above in connection with the appended drawings is intended as a description of an exemplary embodiment of the interlocking pipe support 20, and is not intended to represent the only embodiment. The representative embodiment described in this disclosure is provided merely as an example or illustration and is not intended to be exhaustive or to limit the claimed subject matter to the precise forms disclosed.

In the foregoing description, numerous specific details are set forth in order to provide a thorough understanding of the exemplary embodiment of the present disclosure. It will be apparent to one skilled in the art, however, that the exemplary embodiment of the present disclosure may be practiced without some or all of the specific details. In some instances, well-known process steps or features have not been described in detail in order not to unnecessarily obscure various aspects of the present disclosure. Further, it will be appreciated that the exemplary embodiment of the present disclosure may employ any combination of features described herein.

The present disclosure may also include references to directions, such as "forward," "rearward," "front," "back," "upward," "downward," "lateral," "medial," "in," "out," "extended," "advanced," "retracted," "vertical," "horizontal," "proximal," "distal," "central," etc. These references, and other similar references in the present disclosure, are only to assist in helping describe and understand the particular embodiment and are not intended to limit the present disclosure to these directions or locations.

The present disclosure may also reference quantities and numbers. Unless specifically stated, such quantities and numbers are not to be considered restrictive, but exemplary of the possible quantities or numbers associated with the present disclosure. Also in this regard, the present disclosure may use the term "plurality" to reference a quantity or number. In this regard, the term "plurality" is meant to be any number that is more than one, for example, two, three, four, five, etc. In an embodiment, "about," "approximately," etc., means plus or minus 5% of the stated value.

Thus, while illustrative embodiments have been illustrated and described, it will be appreciated that various changes can be made therein without departing from the spirit and scope of the invention.

The embodiments of the invention in which an exclusive property of privilege is claimed are defined as follows:

1. An interlocking pipe support, comprising:
    a first interlocking bracket configured to interlock with a second interlocking bracket,
    wherein the first and second interlocking brackets have an interlocking position in which they impose a clamping load on the exterior of a pipe,
    wherein each of the first and second interlocking brackets includes:
        a clamp-opposing portion spaced outwardly from the exterior of the pipe in the interlocking position; and
        a pipe-engaging portion that engages the exterior of the pipe in the interlocking position,
    wherein each of the first and second interlocking brackets includes a locking tab receivable within a corresponding locking tab recess of the other of the first and second interlocking brackets when the first and second interlocking brackets are in the interlocking position,
    wherein the locking tabs of the first and second interlocking brackets are spaced apart from each other by the clamp-opposing portions of the first and second interlocking brackets when the first and second interlocking brackets are in the interlocking position.

2. The interlocking pipe support of claim 1, wherein each of the first and second interlocking brackets includes a pipe-surrounding portion extending from a first end, and the clamp-opposing portion and the pipe-engaging portion defined near a second end.

3. The interlocking pipe support of claim 2, wherein the pipe-surrounding portion, the clamp-opposing portion, and the pipe-engaging portion define an interference fit around the pipe in the second interlocking position.

4. The interlocking pipe support of claim 2, further comprising a mounting foot defined at the first end of the first interlocking bracket configured to be secured to a mounting foot defined at the first end of the second interlocking bracket.

5. The interlocking pipe support of claim 2, wherein the first and second interlocking brackets define a central axis when the first and second interlocking brackets are in the second interlocking position, and wherein the first and second interlocking brackets each have an axial length extending along the central axis.

6. The interlocking pipe support of claim 5, wherein each of the first and second interlocking brackets further includes an interlocking slot portion extending between the pipe-engaging portion and the clamp-opposing portion and having an interlocking slot extending axially along a portion of the axial length.

7. The interlocking pipe support of claim 6, wherein the clamp-opposing portion and the pipe-engaging portion define a portion of the first or second interlocking bracket that is substantially S-shaped in cross-section.

8. The interlocking pipe support of claim 6, wherein the first interlocking bracket is substantially prevented from moving axially relative to the second interlocking bracket when the locking tab of each interlocking bracket is received within the corresponding locking tab recess of the other of the first and second interlocking brackets and when the interlocking slot portion of each interlocking bracket is received within the axial slot of the other interlocking bracket.

9. The interlocking pipe support of claim 1, wherein each of the first and second interlocking brackets includes an end engagement surface that engages an interior surface of the clamp-opposing portion of the other of the first and second interlocking brackets when the first and second interlocking brackets are in the second interlocking position.

10. The interlocking pipe support of claim 1, further comprising first and second opposing cut-outs defined on each of the first and second interlocking brackets.

11. The interlocking pipe support of claim 10, wherein the first cutout defines the locking tab recess.

12. The interlocking pipe support of claim 1, wherein the first interlocking bracket substantially mirrors the second interlocking bracket in the second interlocking position.

13. A method of using an interlocking pipe support, the method comprising:
  engaging an axial slot of a first interlocking bracket with an interlocking slot portion of a second interlocking bracket and engaging an axial slot of the second interlocking bracket with an interlocking slot portion of the first interlocking bracket;
  pivoting at least one of the first and second interlocking brackets toward the other of the first and second interlocking brackets about an axis defined substantially along the axial slots of the first and second interlocking brackets such that a pipe-surrounding portion of each of the first and second interlocking brackets urges a pipe into engagement with a clamping portion defined near a first end of each of the first and second interlocking brackets such that the pipe imposes a normal force on a pipe-engaging portion of the first or second interlocking bracket and a clamp-opposing portion of the other of the first and second interlocking brackets opposes the normal force;
  securing a second end of the first and second interlocking brackets together to define an interference fit between the first and second interlocking brackets and the pipe; and
  moving a locking tab of each of the first and second interlocking brackets into engagement with a locking tab recess of the other of the first and second interlocking brackets to substantially prevent axial movement of the first interlocking bracket relative to the second interlocking bracket, wherein moving the locking tab of each of the first and second interlocking brackets results in spacing the locking tab of each of the first and second interlocking brackets apart from each other.

14. The method of claim 13, further comprising positioning the pipe-surrounding portion of each of the first and second interlocking brackets around the pipe before pivoting at least one of the first and second interlocking brackets toward the other of the first and second interlocking brackets.

15. The method of claim 13, wherein an upwardly turned edge extending from the pipe-engaging portion engages the clamp-opposing portion of the other of the first and second interlocking brackets when at least one of the first and second interlocking brackets is pivoted toward the other of the first and second interlocking brackets.

16. An interlocking pipe support, comprising:
  a first interlocking bracket having a first end, the first interlocking bracket including:
    a first locking tab at the first end of the first interlocking bracket;
    a first cutout spaced apart from the first locking tab and the first end; and
    a first axial slot positioned between the first locking tab and the first cutout;
  a second interlocking bracket having a second end, the second interlocking bracket configured to interlock with the first interlocking bracket in a locked position, the second interlocking bracket including:
    a second locking tab at the second end, the second locking tab being received by the first cutout when in the locked position;
    a second cutout spaced apart from the second locking tab and the second end, the second cutout configured to receive the first locking tab when in the locked position, the second locking tab being spaced apart from the first locking tab by portions of the first interlocking bracket and the second interlocking bracket when in the locked position; and
    a second axial slot positioned between the second locking tab and the second cutout, wherein the second axial slot interfacing with the first axial slot when in the locked position.

17. The interlocking pipe support of claim 16, wherein:
  the first interlocking bracket further comprises:
    a first end engagement surface at the first end and adjacent to the first locking tab; and
    a first interior surface;
  the second interlocking bracket further comprises:
    a second end engagement surface at the second end and adjacent to the second locking tab, the second engagement surface configured to engage with the first interior surface of the first interlocking bracket when in the locked position; and
    a second interior surface, the first end engagement surface of the first interlocking bracket configured to engage with the second interior surface when in the locked position.

* * * * *